United States Patent Office 3,419,519
Patented Dec. 31, 1968

3,419,519
METHACRYLIC RESIN-VINYLIDENE CHLORIDE RESIN COMPOSITIONS AND METHOD OF PRODUCTION THEREOF
Hitoshi Abe and Kiyokazu Imai, Kurashiki, Japan, assignors to Kurashiki Rayon Company Limited, Kurashiki, Japan, a corporation of Japan
No Drawing. Filed Dec. 7, 1964, Ser. No. 416,617
Claims priority, application Japan, Dec. 10, 1963, 38/66,265, 38/66,266; Dec. 19, 1963, 38/68,277
6 Claims. (Cl. 260—41)

ABSTRACT OF THE DISCLOSURE

Vinyl chloride-vinylidene chloride copolymer containing 10 to 50% by weight of vinylidene chloride is dissolved in monomeric methyl methacrylate forming a syrup containing 3 to 50% by weight of the copolymer and at least 30% by weight of the methacrylate monomer. This syrup is polymerized in the presence of a suitable polymerization initiator with the production of a transparent non-flammable resin product.

---

This invention relates to excellent molding and laminating compositions consisting of a mixture of methacrylic resin and vinylidene chloride resin and also a method of its manufacture.

The principal object of the invention is to give non-flammability to methacrylic resin-vinylidene chloride resin blends and laminating compositions without lowering the inherent transparency of methacrylic resins.

Another object of the invention is to provide various mixed resin compositions having various blending ratios and different properties.

In order to attain the above object, in carrying out the invention into effect vinyl chloride-vinylidene chloride copolymer within special composition range or polymer blend containing said copolymer is dissolved in a methyl methacrylate monomer or a polymerizable monomer blend consisting mainly of said methyl methacrylate monomer at a desired rate to provide a methyl methacrylate syrup having a suitable concentration and available viscosity and the syrup is used as the raw material to manufacture methacrylic resin-vinylidene chloride resin blend compositions and laminating compositions having non-flammable property without lowering the transparency inherent in methacrylic resin and also having various compositions of different mixing ratios and different properties.

The "polymerizable monomer blend mainly consisting of methacrylate monomers" in the specification means a mixture consisting mainly of methacrylic monomer added with styrene, ethylacrylate, allylmethacrylate, acrylonitrile, ethyleneglycol dimethacrylate and the like polymerizable monomers, and the polymer blend containing vinyl chloride-vinylidene chloride copolymers means a mixture of vinyl chloride-vinylidene chloride copolymers and poly-α-methylstyrene, polymethyl methacrylate and the like polymers.

The methacrylic resin compositions are usually flammable and its non-flammabilization has been considered as one of the problems of improving methacrylic resin compositions and it has been tried to make monomers containing phosphorus or halogen a component of copolymer or to add low molecular weight compounds containing phosphorus or halogen to methacrylic resins.

The homopolymers of vinyl chloride thereby swell in methyl methacrylate monomers, but do not dissolve and accordingly methacrylate syrup can not be produced by using such homopolymers.

Moreover, it has been already known that vinyl chloride homopolymers have no compatibility with methyl methacrylate polymers (refer to R. J. Kern, J. Polymer Sci. 33, 524 (1958)).

Although vinylidene chloride homopolymers merely swell in methyl methacrylate monomers, yet they do not dissolve therein and such homopolymers have no compatibility with methyl methacrylate polymers. On the other hand, vinyl chloride-vinylidene chloride [1] copolymers having a special composition and blending ratio as hereinafter described dissolve uniformly in methyl methacrylate monomers and also have compatibility with methyl methacrylate polymers and by subjecting them to hardening treatment with polymerization a transparent and homogeneous mixed polymer composition can be provided.

Methacrylic resins have disadvantage that they are generally flammable, but in the mixed composition of the invention consisting of a mixture of methacrylate polymer and vinyl chloride-vinylidene chloride copolymer the existence of vinyl chloride-vinylidene chloride copolymer is effective to make the methacrylic resins non-flammable. As the blending ratio of vinyl chloride-vinylidene chloride copolymer to methacrylic resin increases the flammability of the mixed resin compositions decreases and disappears in the case of a self-extinguishing composition and moreover, a mixed composition of methacrylic resin and vinyl chloride-vinylidene chloride copolymer resin having excellent transparency can be obtained.

Further, in the production of glass fiber reinforced methacrylic resins using the syrup according to the invention a mixed composition obtained by the coexistence of vinyl chloride-vinylidene chloride copolymer in the methacrylic resin have the refractive index similar to that of glass fibers and as a result of that the transparency of the glass fiber reinforced methacrylic resin is considerably improved than that which are not added with vinyl chloride-vinylidene chloride copolymer when methacrylic resin is only used. The above syrup has the composition of vinyl chloride-vinylidene chloride copolymer or a mixture of polymers containing vinyl chloride-vinylidene chloride copolymers dissolved in a methyl methacrylate monomer or polymerizable monomer blend consisting mainly of methyl methacrylate monomer and has viscosity of 0.1 to 50 poises at 25° C. which are very suitable for handling.

In a preferred example of the invention, the mixed composition contains, more than 3% by weight and less than 50% by weight of vinyl chloride-vinylidene chloride copolymer in the methyl methacrylate monomer and has viscosity of 1 to 15 poises at 25° C.

In the syrup of the invention, when methyl methacrylate monomer is used with other polymerizable monomer the methyl methacrylate composition preferably occupies at least 30% by weight of the resin composition from the point of compatibility with vinyl chloride-vinylidene chloride copolymer to be added. The kinds and quantities of polymerizable monomers to be used in this case may be selected suitably in order to modify the properties of syrup or resin blend as desired.

The composition of vinyl chloride-vinylidene chloride copolymer to be used in the invention may be suitably selected by considering the relation between the solubility in methyl methacrylate, compatibility with polymethyl methacrylate and the required transparency, yet copolymers containing about 4 to 60% of vinylidene chloride have good compatibility with methyl methacrylate resins and the copolymers containing 10 to 50% of vinylidene

---

[1] This change made at American Consulate General, Osaka, Japan, Dec. 1, 1964.

chloride provide homogeneous compositions having more excellent transparency.

The syrup according to the invention may be used by simultaneously mixing together and dissolving the other polymers such as poly-α-methylstyrene, polymethyl methacrylate and the like, if necessary, thereby enabling to provide syrups having the best physical property and curing property. When vinyl chloride-vinylidene chloride copolymer is used together with the other polymers such as poly-α-methylstyrene, polymethyl methacrylate etc., the combination of such polymers may be suitably selected to alter or modify the quality of the syrup or shaped articles or laminated products without affecting the object of the invention. By adding chain transfer agent or polymerization retarder to the syrup its stability for storage may be increased and moreover, by adding a suitable amount of stabilizers of the copolymer to ultraviolet ray and heat corresponding to the content of vinyl chloride-vinylidene chloride copolymer the mixed resin composition having more excellent stability to ultraviolet ray and thermal stability may be obtained.

Further, the burning resistance of the mixed resin compositions can be made more effective by adding together at the same time antimony compounds, such as antimony oxide, allyl antimony and alkyl antimony, antimony alkoxide, antimony salts of organic acid, antimony halides and also compounds containing phosphorus, such as tricresyl phosphate, diphenyl cresyl phosphate, alkyl diallyl phosphate, trioctyl phosphate, trichloroethyl phosphate, or chlorinated paraffin and other halogen containing compounds.

In case of the syrup prepared according to the invention the excellent characteristics appearing in the molding and laminating process are relatively low exothermic property as well as small shrinking property. Such syrups can be obtained by increasing the rate of polymer to be dissolved in methyl methacrylate monomer, that is, as the polymer content increases the amount of heat evolved on polymerization and the shrinking are reduced. Such characteristics will contribute to the improvement of the quality as well as the elimination of difficulty in operation in the step of manufacturing shaped articles and laminated compositions of methacrylic resins.

The syrup, besides it can be used solely, may be used with addition of glass fibers, natural and synthetic fibers, metal powder and other viscosity augmenters, fillers, dyes, flame retardants or reinforcing substances and the like inert additives. Sheet shaped articles may be molded by using wave shaped or flat plane surface, and also the syrup may be used as a surface laminating agent for plastics, wooden materials and other materials. The hardening treatment with polymerization may be effected under a pressure and at a temperature ranging from room temperature to 160° C. and until substantially 100% polymerization giving resinous compositions containing substantially no residual monomer. When polymerization is effected under a low pressure it requires sometimes evacuation of gases from the syrup before it is used.

The method of manufacturing mixed resin compositions according to the invention is a method to solely polymerize by adding a suitable polymerization initiator to the methacrylate syrup obtained by dissolving a vinyl chloride-vinylidene chloride copolymer or a polymer composition containing mainly vinyl chloride-vinylidene chloride copolymer in a methyl methacrylate monomer or a polymerizable monomer consisting mainly of methyl methacrylate monomer, or a method of laminating and hardening the syrup by adding glass fibers and the like, and thus the mixed resins may be obtained as molding material, besides the above described shaped articles, by suspension polymerization of the syrup.

In the above polymerization process, laminating process and hardening process or suspension polymerization, various techniques used at present in the manufacture of methacrylic resins or polyester laminated products may be utilized.

The invention will be explained further in detail by examples wherein the parts means parts by weight.

Example 1

25 parts of copolymer consisting of 77% by weight of vinyl chloride and 23% by weight of vinylidene chloride were dissolved in 75 parts of methyl methacrylate. The viscosity of the methacrylate syrup thus obtained was 1.0 poise at 25° C. To the syrup were added 2 parts of di-(α-phenylethyl)ether and 0.5 part of 5-chloro-2-hydroxybenzophenone and further mixed with 0.5 part of benzoyl peroxide and the mixture was poured in a hot molding cell and heated in air at 60° C. for 10 hours, then at 90° C. for 3 hours to polymerize and solidify and obtained transparent methacrylic resin.

The resin sheets thus obtained had more non-inflammability than that of hitherto methyl methacrylate homopolymers and their mechanical properties were substantially the same as those of the hitherto products.

Example 2

30 parts of copolymer consisting of 60% by weight of vinyl chloride and 40% by weight of vinylidene chloride were dissolved in 70 parts of methyl methacrylate monomer, the viscosity of the methacrylate syrup thus obtained was 1.6 poises at 25° C. To the syrup was mixed 0.7 part of benzoyl peroxide and the mixture was subjected to suspension polymerization, i.e. 0.6 part of magnesium chloride ($MgCl_2 6H_2O$) was dissolved in 300 parts of 1% aqueous solution of potassium polymethacrylate and the solution was heated to 70° C., then the solution was agitated in a flask at a speed of 350 r.p.m. and added with 1 part of hydrogen peroxide (30% concentration) while agitating, then said syrup was quickly dropped and polymerized for about 5 hours.

Thus, the mixed composition of methacrylic resin and vinyl chloride-vinylidene chloride copolymer resin having excellent transparency was obtained in the granular state (as beads).

Example 3

The syrup obtained in Example 2 was poured in a molding cell and after evacuation by reducing pressure it was hardened with polymerization in an air bath at 60° C. for 10 hours, further at 90° C. for 3 hours and obtained a mixed resin shaped article having excellent noninflammability.

Example 4

A mixture of 30 parts of copolymer consisting of 60% by weight of vinyl chloride and 40% by weight of vinylidene chloride and 5 parts of methyl methacrylate polymer was dissolved in a monomer blend consisting of 62 parts of methyl methacrylate monomer and 3 parts of methacrylic acid monomer to prepare methacrylate syrup.

The syrup thus obtained with addition of 0.8 part of benzoyl peroxide was clamped between heat resisting glass plates together with 25 parts of glass fiber cloth and subjected to heating polymerization and solidified in an air bath at 60° C. for 8 hours, then at 90° C. for 5 hours and yielded glass fiber reinforced methacrylate resin plates having excellent transparency. This reinforced resin plate had noninflammability compared with that of methacrylic resin alone.

Example 5

30 parts of copolymer consisting of 60% by weight of vinyl chloride and 40% by weight of vinylidene chloride and 5 parts of poly-α-methylstyrene were dissolved in 65 parts of methyl methacrylate monomer containing 0.5 part of benzoyl peroxide. The viscosity of methacrylate syrup thus obtained was 12 poises at 25° C. 75 parts of the syrup and 25 parts of glass fiber cloth were polymerized to harden at 60° C. for 5 hours, then further at 90° C. for 2 hours and the laminated article thus obtained was noninflammable compared with a conventional laminated article consisting of 75 parts of methyl methacrylate and 25 parts of glass fibers and moreover, had excellent transparency.

Example 6

30 parts of copolymer consisting of 60% by weight of vinyl chloride and 40% by weight of vinylidene chloride was dissolved in a monomer blend consisting of 67 parts of methylmethacrylate monomer and 3 parts of allyl methacrylate monomer and to the syrup obtained was added 0.5 parts of benzoyl peroxide and subjected to heating polymerization and solidified in the similar manner as in Example 1 and obtained a mixed resin composition having improved noninflammability.

Example 7

30 parts of vinylidene chloride resin having composition of 60% by weight of vinyl chloride and 40% by weight of vinylidene chloride were dissolved in 70 parts of methyl methacrylate, then further added with 5 parts of triethyl phosphate, 1 part of 2,6-di-tert-butyl-p-cresol and 0.1 part of 2-(2'-hydroxy-5'-methylphenyl) benzo triazole and also 0.1 part of 2,2'-azobisisobutyronitrile as polymerization initiator, then the mixture was cast in a molding cell consisting of refractory glass plates to manufacture a cast polymer plate. The polymerization was effected at 50° C. for 5 hours, then 60° C. for 5 hours and for each 3 hours at 80° C. and 100° C. respectively. The resinous plate thus obtained was colorless and transparent the same as methacrylate cast polymer plate and had self-fire extinguishing property.

Example 8

40 parts of vinylidene chloride resin having the composition of 51% by weight of vinyl chloride and 49% by weight of vinylidene chloride were dissolved in 60 parts of methyl methacrylate to prepare syrup, to which were added 1.5 part of 2,6-di-tert.-butyl-p-cresol, and 0.2 part of 2-(2'-hydroxy-5'-methylphenyl)benzotriazole and also 0.3 part of benzoyl peroxide and then the mixed solution was impregnated into 60 parts of glass fiber mat and heated at 110 to 120° C. for 3 hours under a pressure of about 0.05 kg./cm.² and solidified. Thus glass fiber reinforced methacrylic resin plate having self-fire extinguishing property was obtained.

What we claim is:

1. A composition for preparation of nonflammable resinous products which comprises a syrup containing 3 to 50% by weight of vinyl chloride-vinylidene chloride copolymer dissolved in at least 30% be weight of methyl methacrylate monomer based on the weight of the syrup, said copolymer containing 10 to 50° by weight of vinylidene chloride and said syrup having viscosity of 1 to 15 poises at 25° C.

2. A methacrylate resin composition characterized by nonflammability and at least substantial transparency which comprises 97 to 50% by weight of methyl methacrylate polymer and 3 to 50% by weight of vinyl chloride-vinylidene chloride copolymer containing 10 to 50% by weight of vinylidene chloride.

3. A method of producing a methacrylate resin composition characterized by nonflammability and at least substantial transparency which composition consists essentially of methyl methacrylate polymer and vinyl chloride-vinylidene chloride copolymer, which comprises dissolving 3 to 50% by weight of vinyl chloride-vinylidene chloride copolymer containing 10 to 50% by weight of vinylidene chloride in at least 30% by weight of methyl methacrylate monomer based on the weight of the resulting syrup and polymerizing the monomeric component in the syrup in the presence of a free radical initiator.

4. A method according to claim 3, wherein the polymerization is effected in the presence of glass fiber.

5. A method according to claim 3, wherein the polymerization is effected in the presence of an antimony compound selected from the group consisting of antimony oxide, allyl antimony, alkyl antimony, antimony alkoxide, and antimony salt of organic acid.

6. A method according to claim 3, wherein the polymerization is effected in the presence of a phosphorus compound selected from the group consisting of tricresyl phosphate, di phenyl cresyl phosphate, alkyl diallyl phosphate, trioctyl phoshate and trichloroethyl phosphate.

References Cited

UNITED STATES PATENTS

| | | | |
|---|---|---|---|
| 2,315,503 | 4/1943 | Crowell et al. | 260—884 |
| 2,788,545 | 4/1957 | Bauer | 260—884 |
| 2,849,419 | 8/1958 | Hayes et al. | 260—884 |
| 2,921,044 | 1/1960 | Coover et al. | 260—884 |
| 2,992,203 | 7/1961 | Protzman | 260—884 |
| 3,154,600 | 10/1964 | Munn | 260—884 |

MORRIS LIEBMAN, *Primary Examiner.*

RONALD BARON, *Assistant Examiner.*

U.S. Cl. X.R.

260—884